United States Patent

[11] 3,615,756

| [72] | Inventor | Paul J. Jorgensen |
| | | Scotia, N.Y. |
| [21] | Appl. No. | 650,793 |
| [22] | Filed | July 3, 1967 |
| [45] | Patented | Oct. 26, 1971 |
| [73] | Assignee | General Electric Company |

[54] TRANSPARENT THORIA-BASE CERAMICS AND METHOD FOR PRODUCING SAME
4 Claims, 1 Drawing Fig.

[52] U.S. Cl. .................................................... 106/39, 264/82, 313/220
[51] Int. Cl. ........................................................ C04b 33/00
[50] Field of Search ........................................... 106/39, 57; 284/56, 82; 313/220, 225, 227; 252/301.1; 23/142

[56] References Cited
UNITED STATES PATENTS

| 3,432,314 | 3/1969 | Mazdiyasni et al. | 106/57 |
| 3,459,503 | 8/1969 | Roy et al. | 106/39 X |
| 2,937,102 | 5/1960 | Wagner | 106/57 |
| 3,026,177 | 3/1962 | St. Pierre et al. | 23/142 |
| 3,026,210 | 3/1962 | Coble | 106/39 |
| 3,175,919 | 3/1965 | Smoot et al. | 106/57 |
| 3,363,134 | 1/1968 | Johnson | 313/220 |

OTHER REFERENCES

Morgan, C. S. and Hall L. L.; Creep of ThO 2 and ThO 2 CaO Solid Solutions, In. Proc. Brit. Ceram. Soc., 6, (1966) pp. 233-8 TP785.C42

Johnson, J. R. and Curtis, E. E.; Note on Sintering of ThO 2, in Journ. Amer. Cer. Soc., 37 (1954) p. 611. TP785A62

Primary Examiner—Tobias E. Levow
Assistant Examiner—W. R. Satterfield
Attorneys—Richard R. Brainard, Paul A. Frank, Charles T. Watts, Frank L. Neuhauser, Melvin M. Goldenberg and Oscar B. Waddell ABSTRACT: The preparation of high-density thoria-base ceramic bodies containing up to 8 mole percent of CaO is disclosed. These bodies have high orders of in-line transmission of light between about 0.3 and 10.0 microns and are prepared by pressing the mixed powders and sintering in a hydrogen-water vapor atmosphere until theoretical density is achieved.

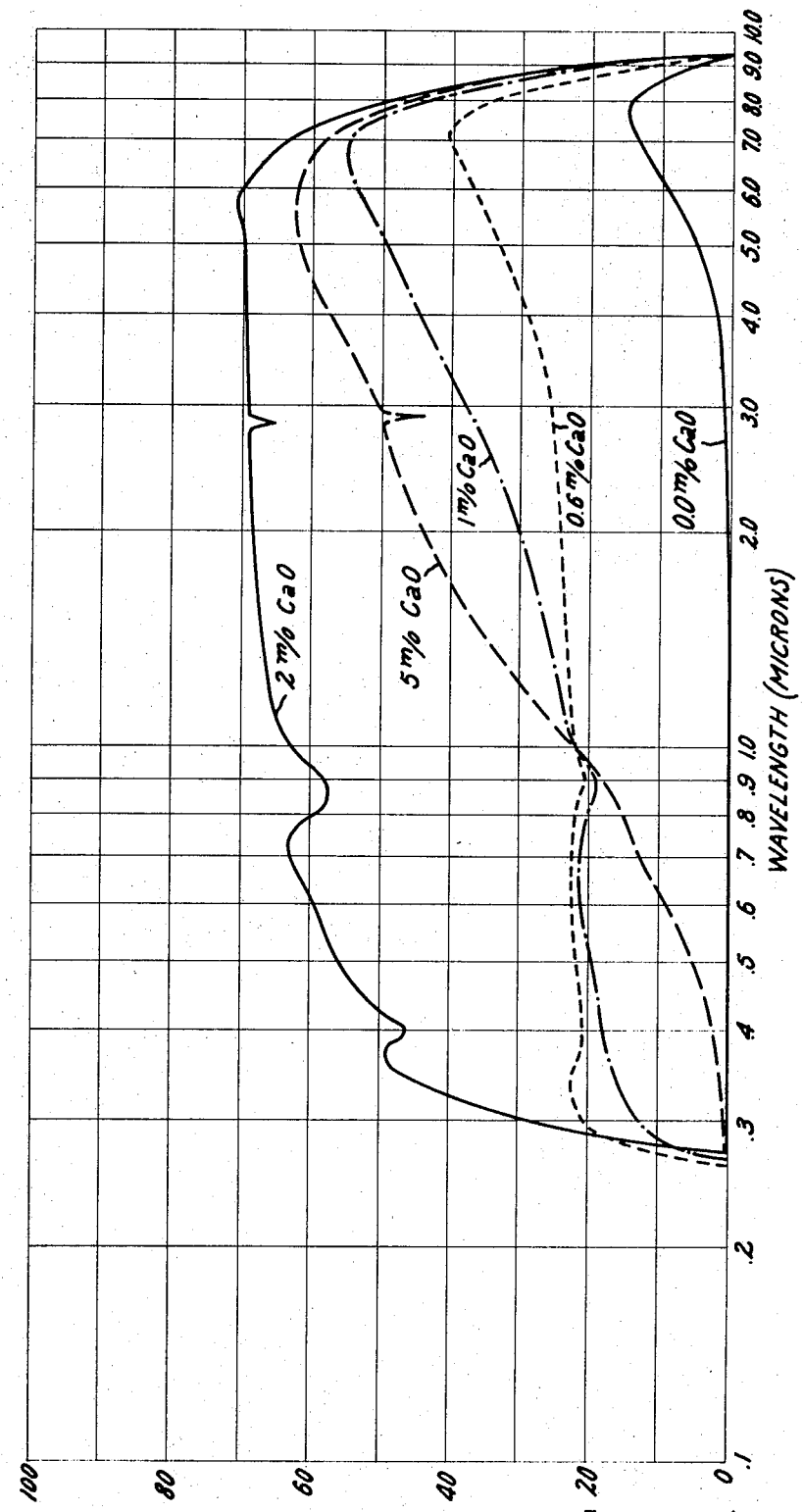

TRANSPARENT THORIA-BASE CERAMICS AND METHOD FOR PRODUCING SAME

Ceramic materials are widely used in high-temperature applications but with few exceptions the materials are completely opaque and cannot be used where light transmission is desired. There exists many situations in which a light-transmitting ceramic would be of significant value, such as, for example, as windows for use in high-temperature equipment. Further, it could be used for high-temperature lamp envelopes and even as a lens material for optical equipment designed to be used at elevated temperatures. In the past, optical transparency in ceramics has been generally achieved through the development and use of single-crystal bodies, usually a time-consuming, comparatively costly and physically limiting (due to size restrictions) way of accomplishing the purpose. Obtention of transparency in polycrystalline ceramic bodies would relieve many of the difficulties related to use of single crystal ceramic but many factors must be considered and overcome before any substantial degree of light transmission can be obtained in a polycrystalline body. For example, such things as the presence of particulate matter of sufficient size may cause light scattering in the body and resultant low transmission. Similarly, pores trapped in the body during sintering to final density scatter light much like particles. All of the preceding problems, and others, must be properly overcome to obtain high-density, transparent ceramic bodies.

A principal object of this invention is to provide a high-density polycrystalline ceramic body having sufficient transmissivity to provide for substantial in-line transmission of radiant energy therethrough.

An additional object of this invention is to provide a thoria-base ceramic body capable of in-line transmission per millimeter of body thickness of at least 30 percent of radiant energy of wavelength in the wavelength range from about 0.3 micron to 9 microns.

A further object of this invention is to provide a thoria-base ceramic body having added amounts of calcium oxide which is substantially transparent.

An additional object of this invention is to provide a process for producing the transparent ceramic bodies of this invention.

Further objects and advantages of this invention will be in part obvious and in part explained by reference to the accompanying specification and drawing, which consists of a series of curves showing the in-line transmission characteristics of calcium-oxide-modified thoria-base ceramics of this invention and unmodified thoria ceramic over the wavelength range of from 0.2 to 10.0 microns.

Generally, the polycrystalline ceramic bodies of this invention are thoria base ($ThO_2$) and contain additions of from about 0.5 to 8 mole percent of calcium oxide (CaO). These bodies are essentially of theoretical density, are polycrystalline of cubic crystallographic form, and are essentially transparent over a wide band of radiation wavelengths. The bodies will contain from about 1 to 5 mole percent calcium oxide as the preferred range and about 2.0 mole percent as the optimum composition. The process by which these bodies are produced comprises preparing the basic ingredients in the proper proportions, pressing the powdered oxide into green bodies and then firing or sintering the green bodies for a time sufficient to effect densification. Care must be taken during the sintering operation, which is normally carried out in a hydrogen atmosphere having a dewpoint of about 0° C., that the operating conditions are such to insure that no reduction of the metal oxides occur or that if any oxides are reduced, they are given an opportunity to reoxidize. Failure to adequately control this important firing operation results in bodies of markedly inferior optical characteristics.

The base material for the composition is, as previously stated, thorium oxide, $ThO_2$, and should be as pure as possible since the presence of any impurities could lead to defects in the final article of manufacture that would reduce its light-transmitting characteristics.

As a specific working example, a quantity of thorium sulfate was calcined at about 1,000° C. to produce fine-grained thorium oxide having a particle size of about 0.05 to 2.0 microns. The thoria was cooled and thoroughly mixed with a quantity of calcium oxide which had a particle size of less than 1,000 A., preferably about 500 A. to yield a mixture containing about 2 mole percent CaO. Fifty grams of the mixture was placed in a flexible rubber container and isostatically pressed in a known manner at 50,000 p.s.i. to yield a compacted "-green" body having a density of about 40 to 50 percent of the theoretical density. The green body was then sintered to theoretical density at 2,100° C. in a hydrogen-water vapor atmosphere having a dewpoint of 0° C. A specimen having a thickness of 1.52 mm. was prepared and the in-line transmission of the material was determined using a DK2 Beckman ratio recording spectrophotometer up to 2.5 microns and a Perkin and Elmer infrared photometer, Model No. 521 for wavelengths between 2.5 microns and 10 microns. The data thus obtained is illustrated graphically by the curve labeled "2 m/o CaO" in the drawing. As will be seen from the curve, the percentage of in-line transmission of this body rises quite sharply to a value approaching about 50 percent at the beginning of the visible spectrum, dips slightly and to a peak value of over 60 percent at about 0.72 microns, dips to about 59 percent at about 0.87 microns and generally rises to a value slightly in excess of 70 percent at about 5.2 microns, whereafter it declines quite steeply to a minimum at about 9.4 microns, all as shown.

Other bodies were prepared in the manner previously set forth having the following compositions and specimens prepared therefrom having the corresponding thicknesses:

| CaO (mole percent) | Thickness (mm.) |
| --- | --- |
| 0 | 1.58 |
| 0.6 | 1.52 |
| 1.0 | 1.54 |
| 5.0 | 1.33 |

The in-line transmission of these specimens were measured as shown by the appropriately referenced curves on the accompanying drawing.

It will be appreciated that the data as presented by the curves in the drawing is actual data for the several specimens having the varying thickness as previously set forth. This data may be used to find the percent of in-line transmission per millimeter of thickness by the following method:

$$I/I_0 = e^{ux}$$

wherein $I$ is the intensity of the light beam after passing through the body,
$I_o$ is the intensity of the incident light beam, and therefore
$I/I_0$ = the in-line transmission ratio,
$e$ is the Napierian constant,
$u$ is the absorption coefficient, and $x$ is the thickness of the sample.

As previously set forth, the 2 mole percent calcium-oxide-containing body had a thickness of 1.52 mm. and at a wavelength of 0.29 had an in-line transmission of about 20 percent. Using the previous relationship $$\log 0.2 = \frac{-1.06(1.52)}{2.303}$$

$I/I_0$=34.7% per mm. It therefore will be appreciated by those skilled in the art that since the specimen thicknesses are all between 1.33 mm. and 1.58, all the transmission data shown by the curves will be substantially raised when calculated on a percent transmission per millimeter of thickness basis. In this regard, the peak in-line transmission for the pure thoria body which was 1.58 mm. thick appears at about 7.75 microns and has a value of about 15 percent. When corrected as above, the transmission at this wavelength is about 30 percent per millimeter.

From all the foregoing, it will be seen that the disclosed thoria base, calcium-oxide-containing ceramic bodies exhibit up to about 70 percent in-line transmission of electromagnetic radiation for the 2 mole percent calcium oxide material in the infrared part of the spectrum, and that all the calcium-oxide-containing ceramics disclosed are significantly more transparent than thoria ceramics without the calcium oxide addition between about 0.25 and 10.0 microns. For example, it will be seen from the drawing that while the in-line transmission at 0.27 micron for the ceramic body containing 5 mole percent calcium oxide is about the same as for the pure thoria body, as the wavelength is increased, the transmission of the calcium-oxide-containing material steadily increases to a maximum value of about 62.5 percent at about 5.5 microns, at which wavelength the pure thoria body has a transmission of about 7 percent. The pure thoria body has a maximum transmission of about 15 percent at 7.7 microns, whereas the calcium-oxide-containing ceramic body has a transmission of almost 50 percent at the same wavelength. It will thus be seen that at corresponding wavelengths between about 0.3 and about 9.0 microns, each of the calcium-oxide-modified thoria ceramics exhibit improved in-line transmission compared to the properties of an unmodified but otherwise substantially identical thoria body.

It will be apparent to those skilled in the art that numerous departures may be made from the specific examples set forth previously. For example, any substantially pure thoria having a particle size between 0.05 and 2.0 microns may be employed in place of that obtained by calcining thorium sulfate. The particle size of the calcium oxide should be less than about 0.1 micron and preferably about 500 A. The pressure employed in the isostatic pressing operation may vary from about 10,000 to 100,000 p.s.i., preferably about 50,000 p.s.i. If die pressing is used, the pressure may range between 10,000 p.s.i. and 50,000 p.s.i., preferably about 30,000 p.s.i. The sintering temperature should be at least about 2,000° C. since temperatures significantly lower than this value require excessively longer periods of time to reach theoretical density. Yet further, the dewpoint of the hydrogen atmosphere may range between about $-25°$ C. to $25°$ C. It will also be obvious that the calcium oxide content may vary between about 0.5 to 8.0 mole percent.

For all of the foregoing reasons, it is not intended that the invention be limited in any way except as set forth in the following claims.

What I claim as new and desire to secure by Letters Patent of the United States is:

1. As an article of manufacture, a high-density polycrystalline thoria-base body consisting essentially of thoria and containing an amount of calcium oxide in the range of from about 0.6 mole percent to about 5.0 mole percent, said body having an in-line transmission per millimeter thickness in excess of 30 percent radiant energy at some wavelength in the range of from about 0.3 to about 9.0 microns.

2. An article of manufacture as set forth in claim 1 in which said calcium oxide is present in an amount of about 2.0 mole percent.

3. The process for producing polycrystalline high-density thoria-base bodies having improved radiant energy transmission properties comprising the steps of: providing a particulate mixture of substantially pure thoria having a particle size between about 0.05 and 2.0 microns and from about 0.5 to 8.0 mole percent of substantially pure calcium oxide having a particle size of less than 0.1 micron, compacting the mixture under pressure in the range of from about 10,000 to 100,000 p.s.i. to form a green body, and firing said green body at a temperature no lower than about 2,000° C. for a time sufficient to effect substantially complete densification under a hydrogen-water vapor atmosphere having a dewpoint of from about $-25°$ C. to $+25°$ C.

4. The process of claim 3 wherein said atmosphere has a dewpoint of about 0° C.